Nov. 27, 1945.   C. WOLF   2,390,021
DECORATED HANDBAG
Filed Oct. 31, 1944
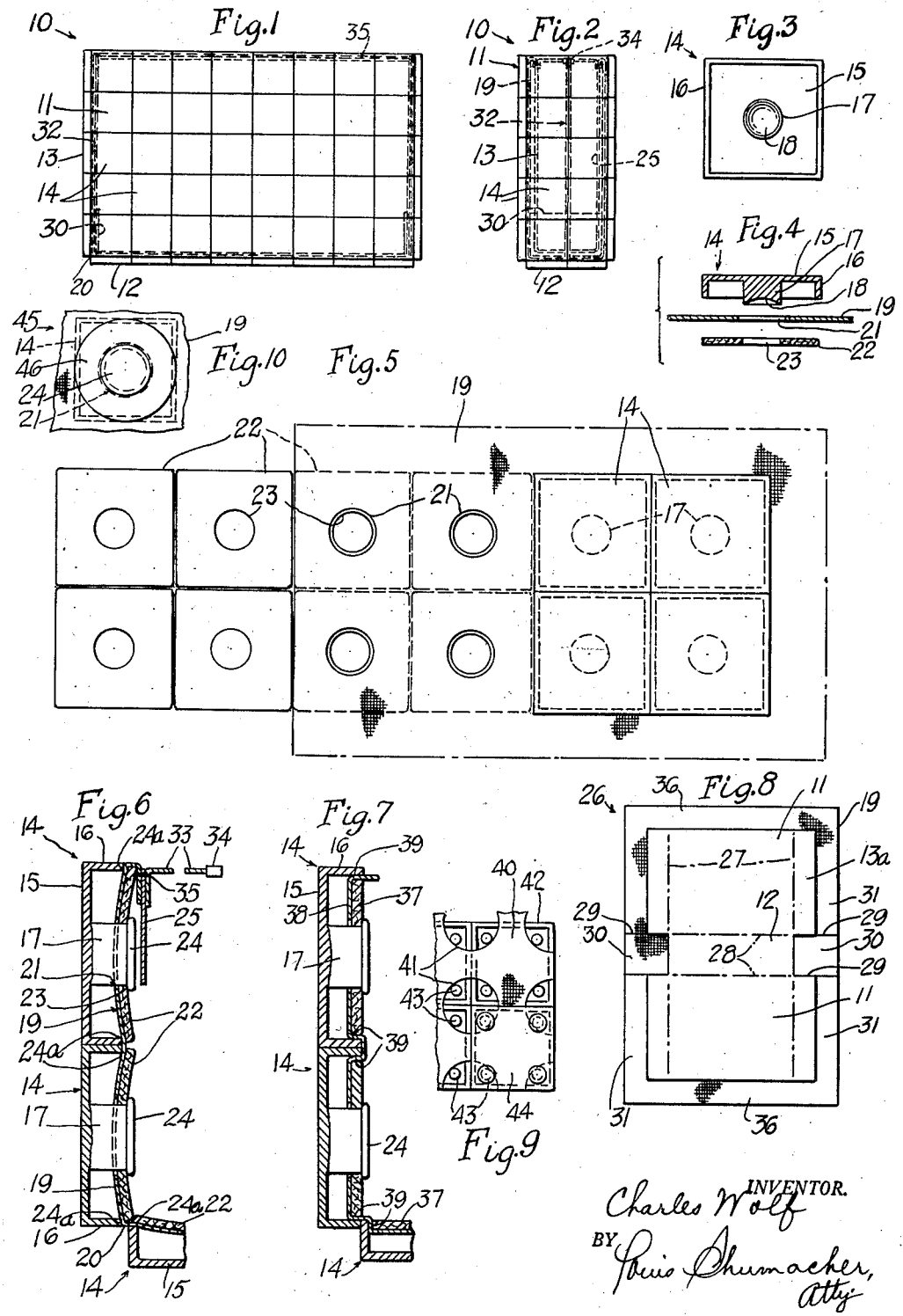

Patented Nov. 27, 1945

2,390,021

UNITED STATES PATENT OFFICE 2,390,021

DECORATED HANDBAG

Charles Wolf, Trenton, N. J., assignor to Plasco, Inc., New York, N. Y., a corporation of New York Application October 31, 1944, Serial No. 561,238

5 Claims. (Cl. 41—34)

This invention relates to improvements in the handbag art.

One object of the invention is to provide an improvement relating to handbags of the type having interlaced decorative plastic elements, wherein the lacing is eliminated, but the flexibility and attractive effects are maintained.

Handbags of the type referred to have attained a very substantial popularity because they are decorative in appearance, quite durable, and possess substantial flexibility in all directions. But the labor and expense involved in interlacing the decorative, plastic elements has long posed an important problem.

It is therefore an object of the invention to provide an improvement in the art whereby decorative elements, of plastic or other rigid material, can be mounted without lacing, and desirably by manipulating a prearranged field of the elements for mounting them all in a single operation, whereby the entire outer handbag wall can thus be produced rapidly and efficiently.

In considering any structure and the process involved, practical considerations require, first, that the decorative elements shall not be so changed as to increase their cost of manufacture, because that would offset any gain; and, secondly, that the manner of assembling shall not introduce operations that may result in marring of the decorative elements or in other complications. As to the first of these factors, the decorative elements should be adapted for manufacture in a single operation, or in a simple die or mold, as heretofore, and not require a compound mold or die. The second factor signifies that no bending or other similar operations on exposed parts shall be necessary, which, in the case of plastics requiring heat and pressure, may result in various visible distortions or marks that would render the handbag defective.

It is therefore another object of the invention to furnish an improvement in the art whereby decorative elements that are easily stripped out of a simple mold can be mounted in a rapid and reliable manner, without any visible marring or distortion, and with the aid of certain base members that afford a positive, permanent connection.

Another object is to furnish a mounting which does not require a resilient or snap connection, since plastics have relatively little resilience, and because undercuts require a compound mold, and since the base members are made preferably of a rigid, cheap material.

In the laced type of handbag referred to, there was always a tendency for the decorative elements to shift about, since the lacing tapes were never tight and the bag had to be flexible. Such shifting occurred along the rows and columns of the elements and diagonally thereof, and the resultant untidy, unsymmetrical effect gradually increased with the use of the bag.

It is therefore an object of the invention to provide an improvement in the art preventing shifting of the decorative in vertical, horizontal and diagonal directions and yet maintaining a high degree of flexibility in the handbag.

Another object of the invention is to furnish an improvement in the art whereby a sheet of flexible or pliable material, such as a cheap piece of textile, can be used for interconnecting a covering field of decorative elements through preformed openings in the sheet.

It will be understood that where the decorative elements are molded on a cloth, they must be spaced for flexibility of the wall, and hence the backing cloth cannot be concealed and is exposed to wear and to soiling.

An important object of the invention is to furnish an improvement whereby a series of decorative elements can be secured to a sheet of pliable material by a continuous clamping action along the edges of each element, thus preventing corner portions of the elements from poking outwardly as heretofore.

Still another object of the invention is to provide an improvement in the art whereby the backing fabric to which the field of decorative elements is fastened or clamped is so arranged as to present a continuous fabric that completely closes the spaces between the elements, thus avoiding the need for an interlining which is required where there are openings as in the case of a laced bag.

Other objects and advantages of the invention will become apparent as the specification proceeds.

With the aforesaid objects in view, the invention comprises the novel features, combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in side elevation showing a handbag embodying the invention.

Fig. 2 is a view in end elevation thereof.

Fig. 3 is an enlarged rear view of a plastic decorative element according to the invention.

Fig. 4 is a sectional view showing the method of arranging parts for mounting the plastic decorative element.

Fig. 5 is a plan view indicating certain successive steps in mounting a series of plastic decorative elements, according to the invention, and as differently shown in Fig. 4.

Fig. 6 is a contracted, fragmentary sectional view of a handbag wall, showing the mounted decorative, plastic elements.

Fig. 7 is a view like that of Fig. 6, but showing a modification of the invention.

Fig. 8 is a diagrammatic view showing the layout of a handbag wall, prior to being fabricated into a handbag.

Fig. 9 is a diagrammatic fragmentary view of another modification, with parts omitted.

Fig. 10 is a fragmentary rear view of another modification.

Referring in detail to the drawing, 10 denotes a handbag embodying the invention. The same may comprise side walls 11, a bottom wall 12, and end walls 13, having decorative elements 14 consisting of a rigid material, preferably plastic. The side and end walls have rows and columns of the elements 14, and of course, the bottom has a plurality of rows of the elements to assure ample capacity in the handbag. The latter may have any suitable closure, such as a slide fastener, not shown.

Each decorative element 14 may be hollow or otherwise concaved to any desired degree, with a front wall 15 and side walls or flanges 16. These flanges need not have the lacing openings heretofore stamped out after the element was removed from the mold, so that the manufacture is simplified. Within the element 14 and extending integrally from the wall 15 are one or more pins, such as a centrally located pin or lug 17 which preferably extends a little beyond the flanges 16. At its end, the pin 17 may be concaved at 18 to facilitate a subsequent heading over, but the pin may also be tubular for this purpose.

The elements 14 are disposed on one side of a sheet 19 of flexible or pliable material so as to lie in edge to edge contact with each other, completely covering and concealing that sheet. However, the sheet will be visible at corners of the bag as at 20, and may also be visible where any slight spacing occurs between the decorative elements 14 due to any slack in the sheet or for any other reason. Hence the sheet should be made of a good, attractive material, and may consist of a textile, or of leather or composition fabric, of ample strength for its intended purpose. Sometimes the front walls 15 of the elements are perforated to show the fabric 19 as a background, and therefore also the structure of the sheet 19 should afford an attractive and neat facing.

The sheet 19 is provided with preformed openings 21 arranged in rows and columns, but is otherwise preferably imperforate in order to have ample strength vertically, horizontally and diagonally. Through the holes 21 extend the pins 17. On the other side of the fabric 19 are disposed individual stiff members 22 for the corresponding decorative elements 14. These members may be made of any suitable material, but I have found fiber board to be wholly satisfactory because of its lightness, this material being like cardboard, but a great deal stiffer and stronger, and unaffected by moisture due to the compositions with which it is impregnated. These members 22 are preferably of the same size and shape as the decorative elements 14, though they are desirably slightly smaller but not so small as to permit them to enter the elements in any manner. Each member 22 is formed with an opening 23 registering with the adjacent pin 17, the latter having its concaved end 18 headed over as shown at 24 to thus rigidly permanently connect the base member to its decorative element.

Preferably the connection between the decorative element 14 and its base member 22 is such that the pin 17 is under tension. This tension may be sufficiently great to slightly inwardly convex the member. Since the flange edges of the decorative element support the member 22 all around, the stiffness of the latter is high and its flexure is somewhat exaggerated in the drawing. Therefore a powerful clamping action is obtained on the fabric 19 at the regions 24a. This clamping is sufficient to prevent any shifting of the decorative elements along the fabric, so that the elements may be said to be thus positioned independently of the spaced holes 21 of the fabric. Hence those holes may be made sufficiently larger than the pins 17 to assure quick and easy register of the same with the holes 21.

By reason of the clamping engagement between the decorative elements 14 and the fabric 19 along all or parts of the edges of the elements, the corners of the latter are so held as to avoid the poking out effect heretofore obtained with lacing. The elements are restrained at all points by the backing sheet 19, as each element is preferably continuously marginally secured to the backing sheet.

There are no openings visible in the backing fabric 19 at corners such as 20 or at points where the decorative elements may otherwise slightly separate. Even if the front walls 15 should be decoratively perforated, the fabric 19 would appear as a neat, continuous and attractive member, because the openings at 21 may be spaced from such perforations and hence invisible. Therefore an interlining which was necessary with laced bags to cover up any padding or the like that is sometimes used in the walls of handbags can be omitted. Other than the sheet 19, there need only be the regular handbag lining 25. If more of the sheet 19 is to be seen as a background for the plastic elements 14 then some slack may be provided in the sheet between the elements, as by spacing the latter a little. Otherwise, the members 22 tend to slightly concave the backing sheet 19 into the elements and create a tension in the sheet, whereby the elements are drawn into snug contact with each other. Nevertheless the flexibility of the wall is maintained, because the pliable sheet 19 forms hinges between the elements at all sides thereof and permits the wall to easily bulge outwardly due to the contents of the handbag.

It will be appreciated that the marginal clamping engagement at 24a may be obtained regardless of the specific nature of the fastening between elements 14 and their base members 22. Useful results may be obtained without such marginal engagement, in which case the openings 21 in the sheet 19 are the effective means for positioning or spacing the decorative elements. In either case the sheet 19 has ample strength along the rows and columns and diagonally thereof to prevent shifting of the decorative with the resultant untidy effects often observed in laced handbags.

The manner of producing and assembling the wall structure referred to will now be described, after which it will be readily understood how a handbag is made therefrom. The decorative elements 14 can be made in a simple mold from which they are easily stripped because ample draft is provided which need not be shown in the drawing. Compound molds such as would be necessary in forming an undercut for a snap action engagement between an element and its base member 22 are not required. As in Fig. 4, a sheet 19 is placed over a base member 22, with the openings 21 and 23 in register, and then the decorative element 14 is applied with its pin 17 passing through said holes. Finally a heated member engages the end of the pin, softens and heads it over while the member 22 is centrally pressed and convexed toward the element to provide a tension for clamping the sheet 19 as at 23. By cooling the plastic while the pressure is maintained there is no opportunity for a release of the plastic. No marring or distortion of the plastic decorative elements is caused because only the pins 17 are heated, and these are not visible in the completed handbag.

The process described lends itself to mass assembling. Thus, according to Fig. 5, a field of base members 22 is laid out in proper relation to each other in a suitable form or platen that may have recesses for the individual members, if necessary. Then a large sheet 19 is placed over all the members 22 with the openings 21 and 23 in register. Now a corresponding field of decorative elements 14 is assembled in a suitable head or holder, and thus brought down so that the pins 17 pass through the holes, and pressure is exerted to slightly convex the members 22 into the elements 14. Finally heated plungers may pass through openings in the bottom platen for the members 22, to engage and head the pins 17 over the members 22. While the pressure is maintained the plungers are withdrawn and the heads 24 allowed to cool or the hardening accelerated by a cooling fluid, after which the wall is complete. By this process a wall such as 26 in Fig. 8 can be made, adapted to be readily formed into a handbag. The apparatus referred to is considered to be self evident from the description and hence is not shown in the drawing.

The wall 26 of Fig. 8 shows side walls 11 and bottom wall 12 for the bag, the end walls 13 being each provided by a pair of sections 13a. The handbag is produced by folding the wall 26 on the dot-dash fold lines 27, 28, as will be readily apparent. The sheet 19 projects on all sides beyond the field of decorative elements indicated by the walls 11, 12 and 13a, and is slitted at 29 up to the bottom wall to form small rectangular sections 30. As the folding proceeds on lines 27, 28, the sections 30 are turned upward, the sections 13a are brought together and the projecting portions 31 of sheet 19 are seamed together and to the adjacent section 30 as at 32 to form a bag. Finally a lining 25 and the stringers 33 of a slide fastener 34 are sewn at 35 to the other projecting sections 36 of the flexible sheet 19, the lining being then inserted into the bag with the portions 36 folding inward as shown in Fig. 6. Any other mode of making a wall such as 26 into a bag may be followed, the object here being to show how a fabrication is possible which cannot be practised with a laced bag, where each tape must be individually anchored, or secured to a stiffener member onto which the lining may be connected. Here the sheet 19 may be utilized as in the conventional manner of making a bag, for example, wholly out of cloth, and without using any plastic decorative elements.

As produced herein, the handbag 10 has only a single lining 25, between which the sheet 19 and any suitable padding may be placed, if required, without showing or pushing out through openings in the wall. Hence an interlining is avoided.

In Fig. 7 is shown a modification of the invention which is different solely in that the clamping of the flexible backing sheet occurs within the decorative elements, instead of at the edges of the flanges thereof. Hence the base members 37 are smaller than those at 22 and force the backing sheet 38 into the elements for a continuous clamping as at 39. Here the clamping may be more powerful than at 24a, and the pin need not be under any substantial tension, so that the wall can be removed after the heads 24 are formed without waiting for them to cool. But the fabric 38 is subject to considerable distortion and contraction so that an entire field of elements cannot be assembled and headed at 24, but only one or two rows of the elements may be so manipulated at one time. But this drawback can be avoided by using an elastic sheet member 38.

In Fig. 9 is shown another modification showing how a laced appearance can be obtained if desired, by using a single continuous flexible backing sheet 40 having spaced holes 41. Each decorative element 42 has one pin 43 in each corner, and base members 44 like those at 22 are provided except that each has four holes for receiving the four pins of its decorative element. Each opening 41 is centered on an intersection of four elements 42, and hence receives a corner pin of each. Then the base members 44 are applied for their individual elements 42, to receive the pins 43, which are thereupon headed over as at 24. A clamping engagement as at 24a or 39 may be obtained. Intermediate of the holes 41, the narrow sections of the backing sheet 40 appear like tapes when they show through spaces between that may occur between the elements 42. But in this structure, an interlining is necessary, the corners of the elements will tend to poke outward, the backing sheet is weakened by the size of the holes 41, but the lacing operation is eliminated as well as the tendency of the elements to shift about as in laced bags.

It will be appreciated that in the principal form of the invention shown in Figs. 1 to 7, there is no straining or tearing of the flexible backing sheet at the holes thereof, since the sheet is independently secured by the clamping action of the resilient members 22. The pins 17 may be regarded as exemplifying any headed or undercut securing means.

Fig. 10 shows a modification 45 which is exactly like the structure of Figs. 1 to 6 except that the base member 46 is round to facilitate handling in course of assembling. Here the clamping action is more limited in area, avoiding straining of the sheet member 19 at the corners due to bulging of the bag wall. This is therefore the preferred form of the invention.

The preferred method of assembling the bag is to apply the plastic elements such as 14 solely between the lines 27, leaving the sections 13a blank. The latter are sewn together as hereinbefore described at 30, 32, to form a bag, and then plastic elements 14 are applied to the sections 13a by engagement with their base members as previously described. Thus the seaming is easier to perform.

I claim:

1. A decorative, flexible handbag material including a field of oblong, interfitted, box-like decorative elements molded of plastic material and each being fully open at the rear thereof, said elements having rearward extending projections substantially wholly therein, disposed inwardly of the side walls of the elements, and sheeting means interconnecting the elements at the rear thereof and cooperating therewith to produce a continuous, flexible, decorative handbag material, said flexible sheeting means being perforated to receive the projections and the latter being headed over thereon, the flexible sheeting means having sections consisting of relatively stiff material having outer edges disposed in relatively close proximity to the side walls of the individual elements and within the areas of the respective elements to cause the side walls of the elements to snugly bear at their free edges against the sheeting means.

2. A decorative, flexible handbag material including a field of interfitted, molded decorative elements, said elements being of generally box-like form fully open at the rear face and having rear projections disposed inward of the side walls of the elements, relatively stiff backing members for the elements, and a rear facing member extending continuously between the backing members and the elements, the projections passing through holes in the facing member and in the backing members and being headed over on the latter to permanently secure the same, the backing members being so related to the decorative elements that the free edges of the side walls of the decorative elements are caused to snugly bear against the facing member.

3. A decorative handbag material including a field of oblong, interfitted, box-like decorative elements of molded plastic fully open at the rear and having rearward extending projections substantially wholly therein connected to the front walls of the elements and being disposed inward of the side walls thereof, the side walls having generally free rear edges, relatively stiff backing members for the elements perforated to receive the projections, and a pliant sheet member extending continuously between the decorative elements and the backing members and having holes receiving the projections, the latter being headed over on the backing members for clamping the sheet member therebetween, the backing members being of such size as to cause the side walls of the elements to snugly clamp against the sheet member at the free edges of the side walls, and the backing members being resiliently deformed inwardly of the latter to increase such clamping, whereby the decorative elements are adapted to maintain continuous marginal contact with the sheet member.

4. Decorative handbag material including a box-like element made of molded plastic and having a decorative front wall and side walls leaving the element fully open at the rear thereof, said element having a projection within the same integrally connected to the front wall and being disposed inward of the side walls, a resilient backing member of fiberboard, and a member of pliable sheet material between the backing member and the element, said members having openings for receiving the projection with the latter being headed over on the backing member, and the backing member cooperating with the element to cause the sheet member to be clamped therebetween at the otherwise free edges of the side walls, and the backing member being laterally tensioned by the projection and being thus resiliently deflected inwardly of the element for an increased clamping of the sheet member at said edges.

5. Decorative, flexible, handbag material including a field of closely interfitted box-like decorative elements consisting of molded plastic and being fully open at the rear thereof, and sheeting means interconnecting the elements at the rear thereof to form the latter into a continuous decorative sheet, the elements having projections located substantially wholly therein in spaced relation to the side walls of the elements and extending rearward, said means including backing portions perforated to receive the projections and the latter being headed over thereon to thus cause the elements to be secured to the sheeting means, the backing portions consisting of a fiber-board-like material extending to the edges of the side walls of the elements and being resiliently depressed into the elements whereby the free edges of their side walls are caused to snugly clamp against the sheeting means, and the latter cooperating with the elements so that the connection between different elements is flexible in character.

CHARLES WOLF.